July 28, 1953   M. H. L. SÉDILLE   2,646,663
SEMIOPEN CIRCUIT GAS-TURBINE ENGINE
Filed June 26, 1950
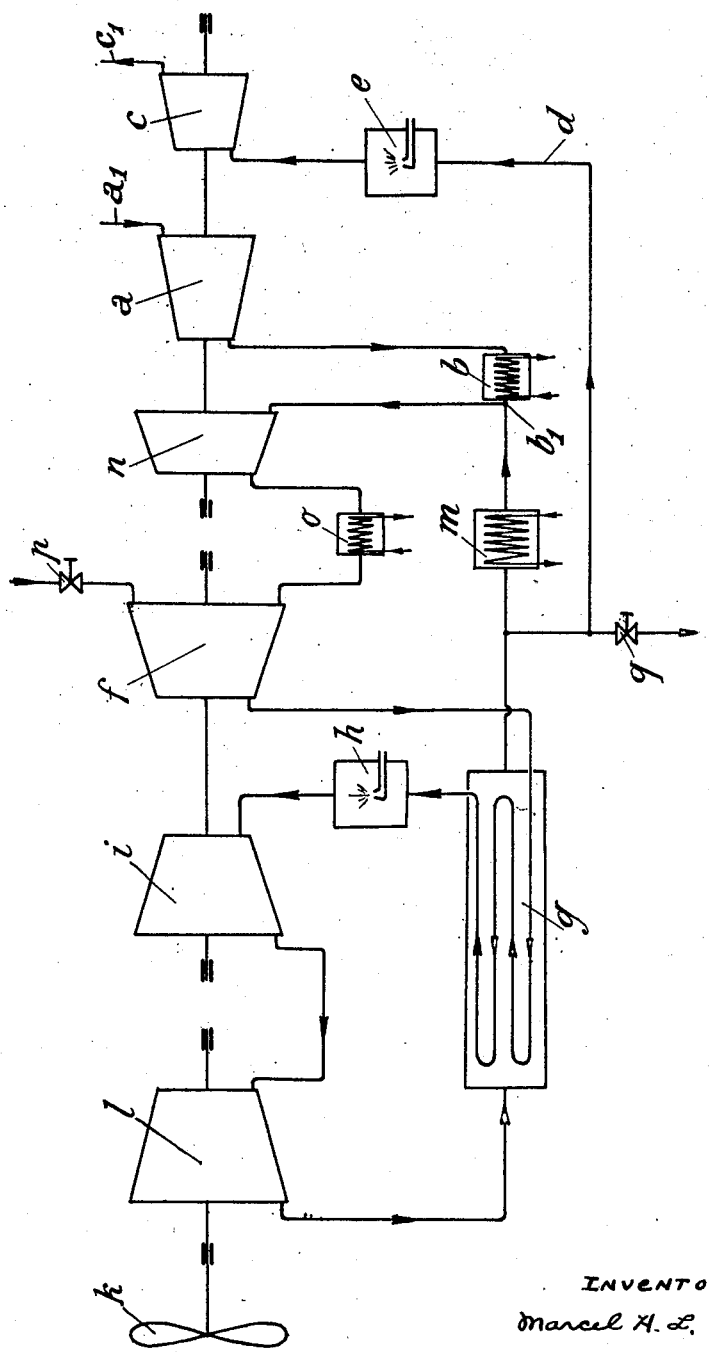
INVENTOR
Marcel H. L. Sédille
By Watson, Cole, Grindle + Watson Patented July 28, 1953

2,646,663

UNITED STATES PATENT OFFICE 2,646,663

SEMIOPEN CIRCUIT GAS-TURBINE ENGINE

Marcel H. L. Sédille, Paris, France, assignor to Societe Rateau (Societe Anonyme), Paris, France, a company of France, and Rene Anxionnaz, Paris, France Application June 26, 1950, Serial No. 170,279
In France August 31, 1949

3 Claims. (Cl. 60—39.17)

It is known that open circuit gas turbines necessarily operate with a large excess of air in order to limit the temperature of the motive gas, thus entailing a considerable air flow for a given rating. Semi-open circuit gas-turbine engines comprising a closed circuit high-pressure cycle and a low-pressure supercharging or air-renewal cycle including a compressor and a gas turbine, enable to limit the inflow of fresh air to the minimum required for ensuring adequate combustion. The gas-turbine low-pressure unit usually generates, besides the work required for the compression of fresh combustive air, a make-up mechanical power which can be used directly or for driving an electric generator or any power absorbing apparatus.

The present invention concerns an improvement in known semi-open circuit engines, consisting essentially in using the excess energy generated by the low-pressure unit for driving a make-up compressor inserted into the high-pressure closed circuit.

The gas-turbine power plant thus constituted enables to achieve a high power-to-weight ratio at maximum rate and is particularly suitable for propulsion of ships and aircraft. Furthermore, by cutting off momentarily the supercharging unit, it is possible to reduce greatly the generated power, for instance at cruising speed.

Other objects and advantages of the invention will be apparent during the course of the following description.

In the accompanying drawing forming a part of this application and in which like numerals are employed to designate like parts throughout the same, the figure is a diagram of an embodiment of the invention.

The power plant illustrated comprises, by way of non-limiting example:

(1) A low-pressure open circuit including a low-pressure air compressor $a$ sucking in at $a_1$ ambient air and discharging it into the high-pressure circuit; an air cooler $b$ can be inserted in the outlet duct. This compressor $a$ is driven by a low pressure gas turbine $c$ supplied through a duct $d$ branching off from the high-pressure closed circuit; the gas flowing through $d$ can be reheated in a combustion chamber $e$. The turbine $c$ exhausts to the atmosphere at $c_1$.

(2) A high-pressure closed circuit including a high pressure air compressor $f$ feeding motive gas, through a recuperator $g$ and a combustion chamber $h$, to a high-pressure gas turbine set which, in the present example, is shown to comprise an auxiliary gas turbine $i$ driving said compressor $f$ and a motive gas turbine $l$ generating the effective power absorbed by any apparatus $k$ (a screw or the like, with or without a reduction gear). The exhaust gas of the motive turbine $l$ is then fed to the recuperator $g$, and divides into two flows one of which is fed to the turbine $c$ of the low-pressure circuit and then exhausts to the atmosphere at $c_1$, whereas the other of which flows back, after having been cooled in a heat-exchanger $m$, through the high-pressure closed circuit. This second gaseous flow mixes in $b_1$ with combustive air supplied by the low-pressure open circuit and the new flow thus formed, is compressed by means of an auxiliary compressor $n$ driven by the low-pressure gas turbine $c$, and using the excess energy generated by the latter. Lastly, the compressed gas thus obtained and containing a sufficient amount of oxygen for combustion purposes, can be cooled in a heat-exchanger $o$ before flowing into the high-pressure compressor $f$.

It is obvious that the above arrangement is given as a mere example. Actually each of the compressors can be composed of several stages in series or in parallel, cooling being effected by means of heat-exchangers during compression, and the various gas turbines of the high- and low-pressure circuits can each comprise one or more stages in series or in parallel, occasionally with combustion chambers for intermediate reheating.

A gas-turbine power plant of the type described offers the advantages of semi-open circuit plants whose turbines and compressors are designed for reduced air and gas flows compared with open circuit gas-turbine power plants.

The load of the plant is adjusted by acting on the pressure prevailing in the high-pressure closed circuit, i. e. by adjusting the discharge pressure of the compressor $a$ in the low-pressure open circuit. The lowest pressure of the high-pressure closed circuit can then reach the value of atmospheric pressure.

Furthermore, the plant is particularly suitable for achieving reduced power at cruising rate, by stopping the low-pressure unit, the high-pressure unit then operating alone. In order to ensure adequate supply of combustive air, it is sufficient to provide for an atmospheric air inlet at $p$ upstream with respect to the compressor $f$ and for a burnt gas outlet at $q$ for instance, downstream with respect to the recuperator $g$.

It is to be understood that the form of the invention herewith shown and described is to be taken as a preferred example of the same and that various changes in shape, size and arrangement of parts may be resorted to without departing from the spirit of the invention or the scope of the subjoined claims.

What I claim is:

1. In a power plant of the type described, the combination comprising a high-pressure compressor, a high-pressure gas turbine mechanically coupled to said high-pressure compressor, piping means between the discharge end of said high-pressure compressor and the intake end of said high-pressure gas turbine, heating means in said piping means, an auxiliary compressor mechanically independent from said high-pressure compressor and discharging into same, a line between the exhaust end of said high-pressure gas turbine and the suction side of said auxiliary compressor, a low-pressure compressor discharging at a point of said line, a low-pressure gas turbine mechanically coupled to said low-pressure compressor and auxiliary compressor, and tapping means at a point of said line for feeding said low-pressure gas turbine.

2. The combination of claim 1, in which the former-mentioned point of the line is downstream of the latter-mentioned point, cooling means being provided in said line between said points.

3. The combination of claim 1, further comprising duct means for connecting the suction side of the high-pressure compressor to the atmosphere, valve means for controlling said duct means, further duct means for connecting the exhaust end of the high-pressure gas turbine to the atmosphere, and further valve means for controlling said further duct means.

MARCEL H. L. SÉDILLE.

References Cited in the file of this patent

UNITED STATES PATENTS

| Number | Name | Date |
|---|---|---|
| 2,245,954 | Anxionnaz | June 17, 1941 |
| 2,341,490 | Traupel | Feb. 8, 1944 |
| 2,361,887 | Traupel | Oct. 31, 1944 |
| 2,454,358 | Traupel | Nov. 23, 1948 |

FOREIGN PATENTS

| Number | Country | Date |
|---|---|---|
| 368,317 | Great Britain | Mar. 4, 1932 |